May 11, 1954 S. C. HETH ET AL 2,678,239
FORAGE BLOWER
Filed July 1, 1950 5 Sheets-Sheet 5
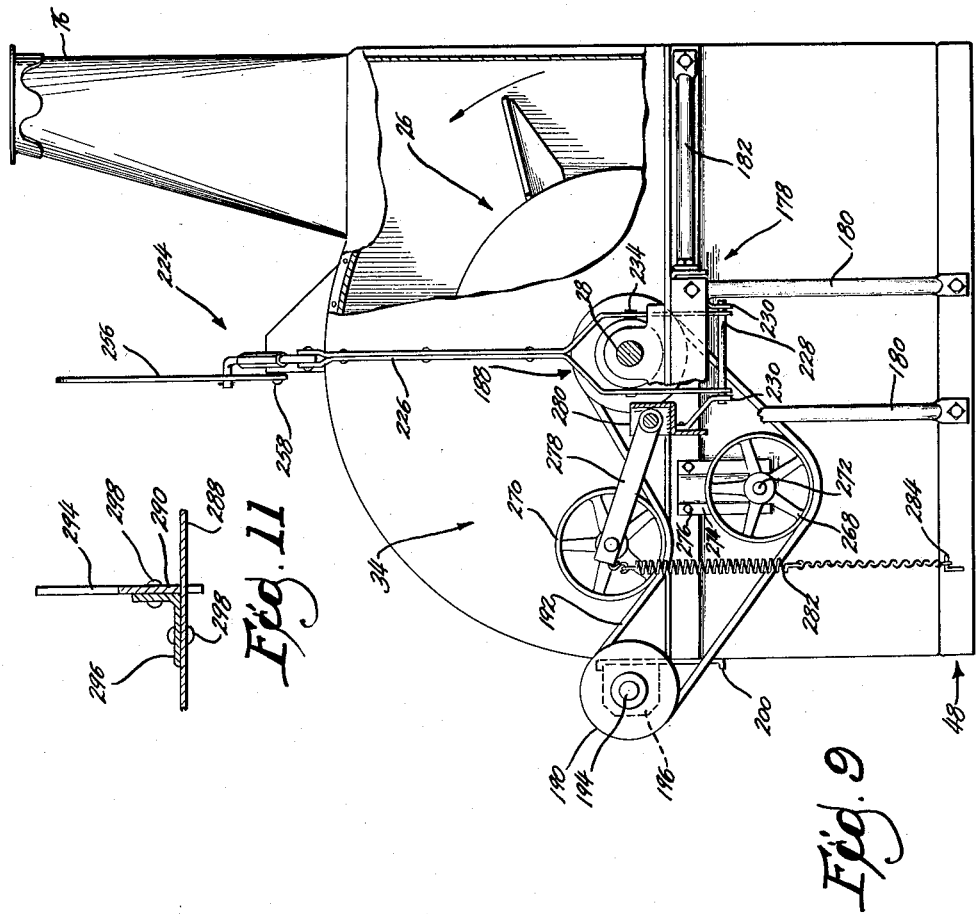
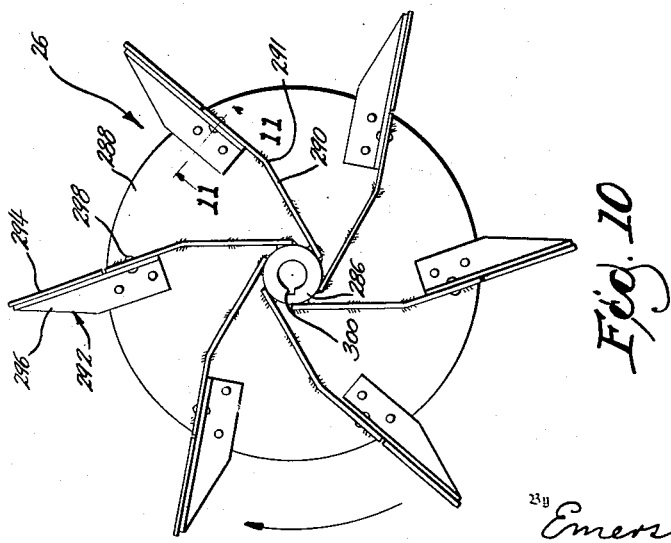
Inventor
SHERMAN C HETH
HOWARD E WILTSEY
By Emerson B Donnell
Attorney Patented May 11, 1954

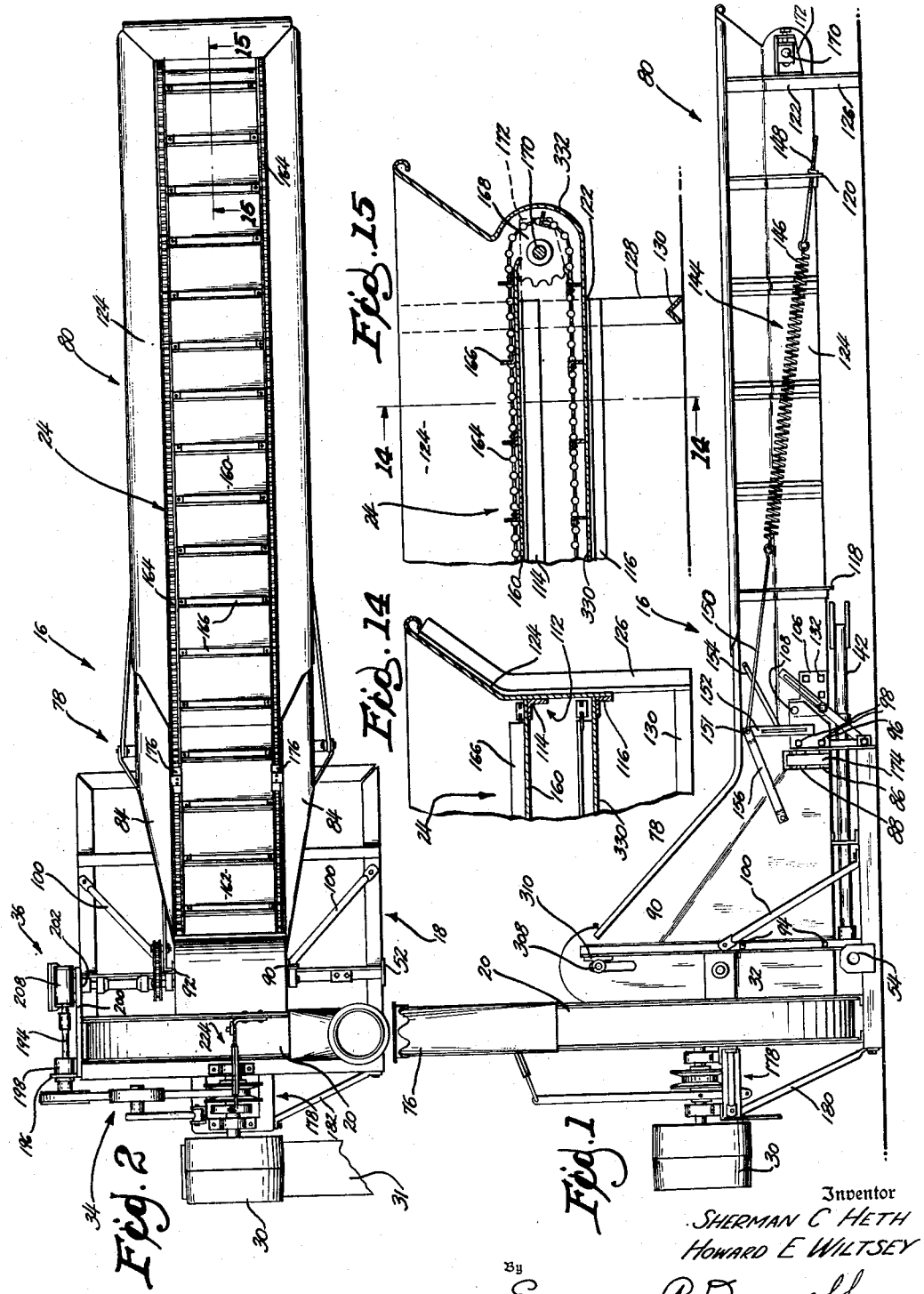

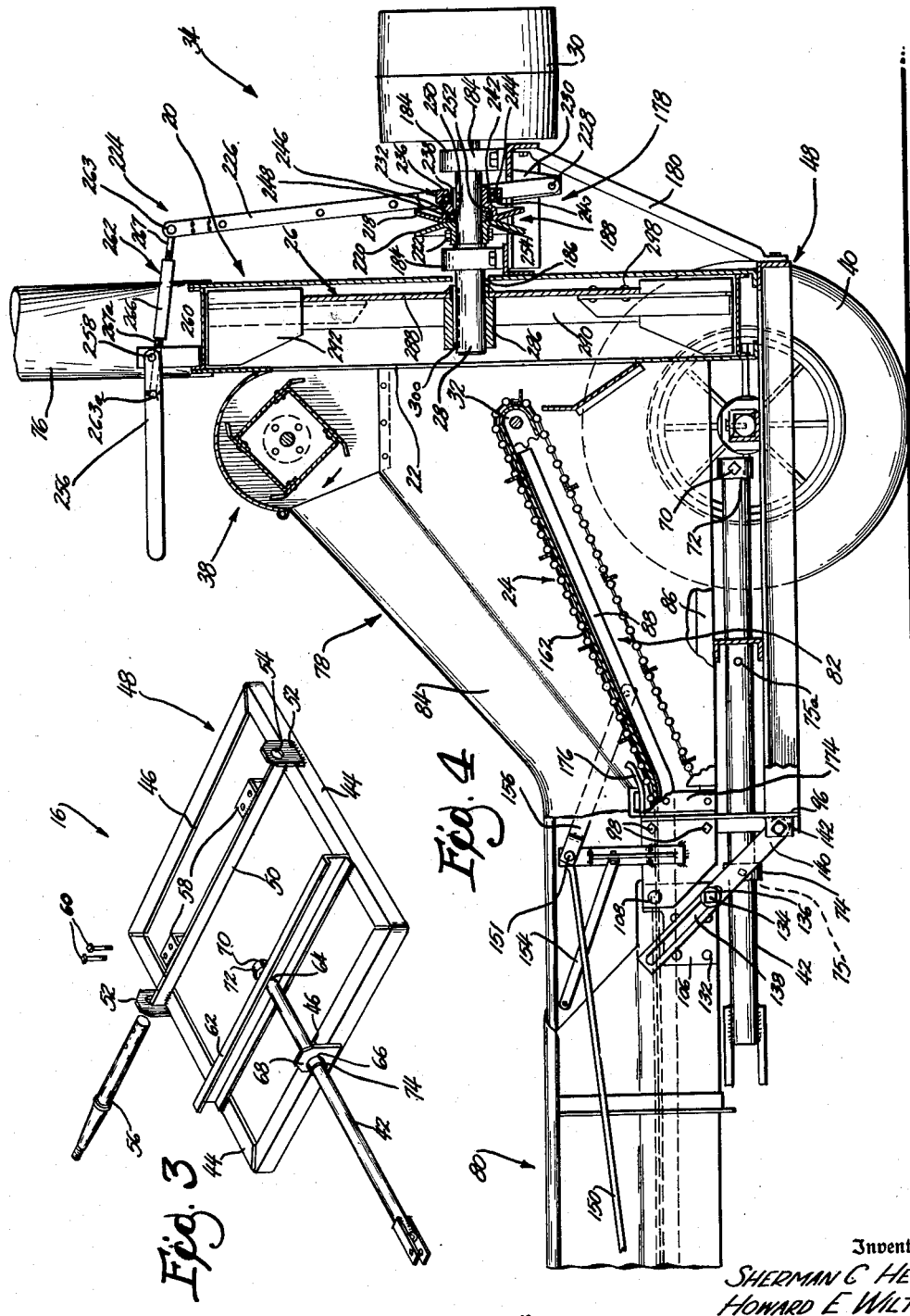

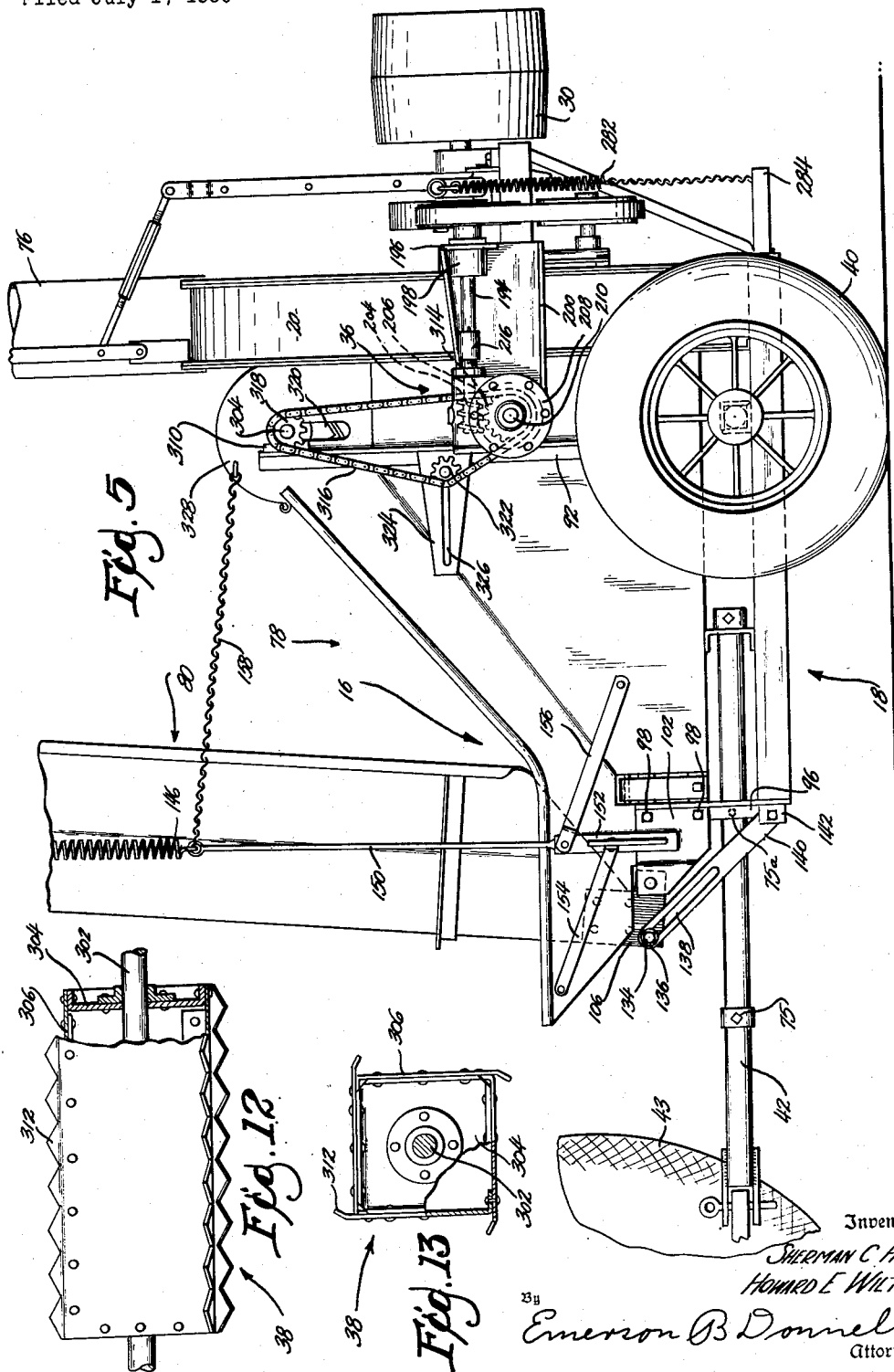

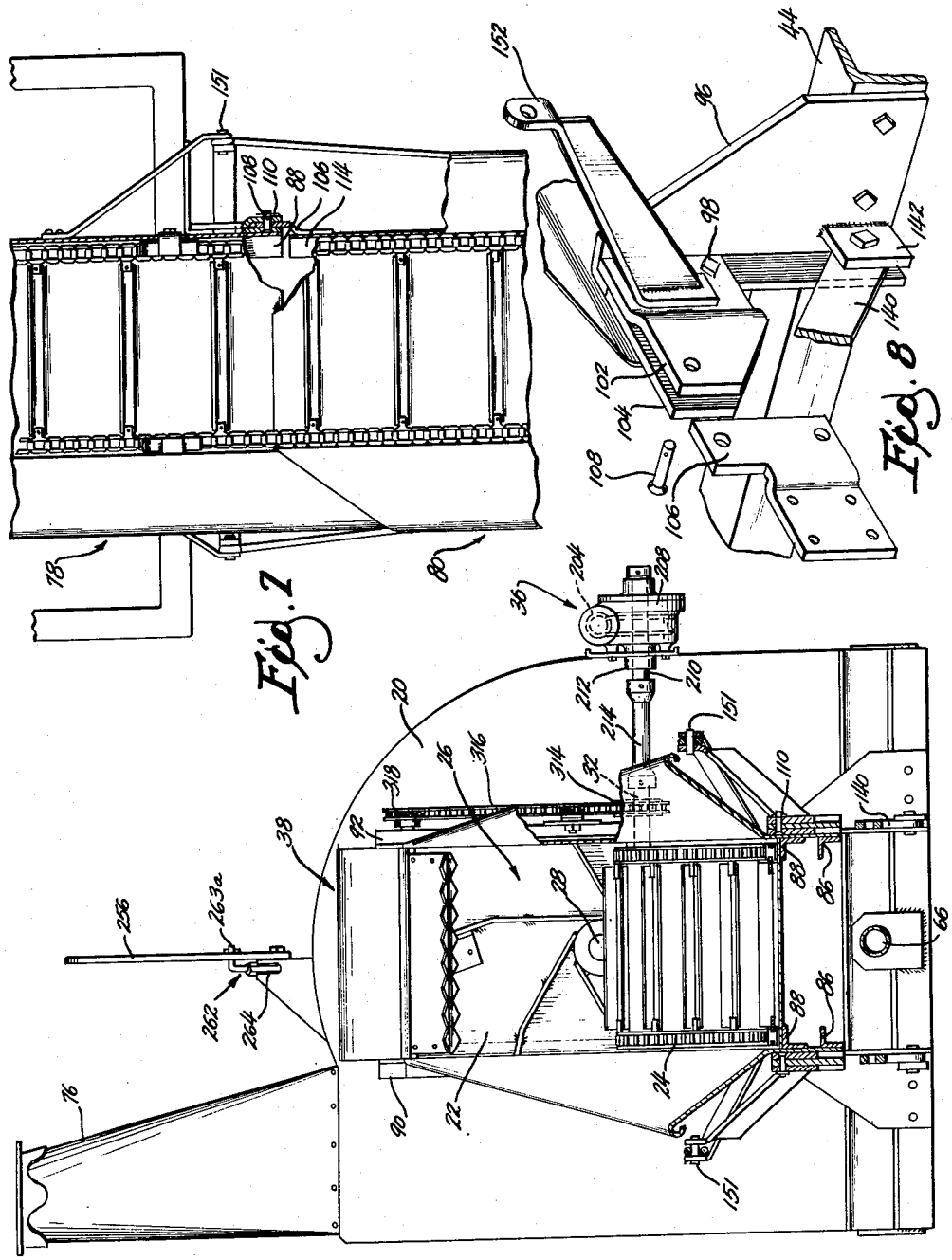

2,678,239

UNITED STATES PATENT OFFICE 2,678,239

FORAGE BLOWER

Sherman C. Heth and Howard E. Wiltsey, Racine, Wis., assignors to J. I. Case Company, Racine, Wis., a corporation of Wisconsin Application July 1, 1950, Serial No. 171,682

13 Claims. (Cl. 302—37)

This invention relates to ensilage blowers and an object thereof is to generally improve the operation and construction of such machines.

It is now common practice to harvest corn and other crop material by means of a harvester which travels over the field and harvests the crop, at the same time cutting it into short lengths for storing as ensilage. If the material is to be stored in the conventional silo it is necessary to provide for elevating it into the same. Unlike the ordinary silo filler, which takes the crop in long lengths, as cut from the field, comminutes it and projects it by a combined throwing and blowing action, upwardly into the silo, which may be as much as 75 feet high, the device of the present invention must work on material which is already comminuted when received at the silo, and which fact introduces problems of receiving, feeding, regulation etc. which are solved in a novel manner by the expedients set forth in the following disclosure.

Another object of the present invention is to provide an ensilage blower employing a simplified driving means whereby the speed of travel of the feed conveyor may be varied to regulate the flow of material to be handled by the blower fan.

Yet another object of this invention is to provide an ensilage blower employing an improved fan wheel wherein the material will be accepted into the fan wheel at an area of relatively low velocity and gradually accelerated until it is thrown out the discharge port.

Still another object of this invention is to provide an ensilage blower embodying a frame, a blower mounted on the frame, and a feed hopper pivotally secured to the frame forwardly of the blower, whereby a compact structure can be had, convenient to move from one place to another and one which will occupy a nominal amount of space when in storage.

A still further object of this invention is to provide a blower which is capable of being easily and cheaply manufactured.

Other objects and advantages of this invention will become apparent by reference to the following description, and the accompanying drawings of a preferred embodiment thereof.

In the drawings:

Fig. 1 is a right side elevation of a forage blower embodying the present invention shown in an operative position.

Fig. 2 is a plan view of the forage blower disclosed in Fig. 1.

Fig. 3 is a perspective view of the main frame of the machine disclosed in Fig. 1 showing the drawbar construction and the wheel supporting construction.

Fig. 4 is a left side elevation of the machine disclosed in Fig. 1 slightly enlarged and with parts removed showing details in construction of the blower housing, the speed regulating means, and the receiving trough.

Fig. 5 is a left side elevation of the machine disclosed in Fig. 1 slightly enlarged and with parts removed showing the machine positioned for transport and attached to a tractor.

Fig. 6 is a front view of the machine shown in Fig. 5, with parts cut away to show details in construction.

Fig. 7 is a plan view slightly enlarged of the machine shown in Fig. 2, with parts removed showing the juncture of the conveying trough with the receiving trough when the machine is in an operating position, broken away to show details in construction.

Fig. 8 is a perspective view of the construction for pivotally connecting the receiving trough to the conveying trough, slightly enlarged, and with parts removed.

Fig. 9 is a rear view slightly enlarged of the forage blower with parts removed.

Fig. 10 is a front view of the blower fan shown in Fig. 4 showing details and construction, and with parts removed.

Fig. 11 is a view taken on the line 11—11 of the Fig. 10 slightly enlarged.

Fig. 12 is a plan view of the beater shown in Fig. 4 slightly enlarged and having a portion removed to show details in construction.

Fig. 13 is an end view of the beater shown in Fig. 12 having a portion removed to show details in construction.

Fig. 14 is a view taken on the line 14—14 of Fig. 15 to be described presently, showing details in construction, with parts removed.

Fig. 15 is a horizontal sector, slightly enlarged, taken on the line 15—15 of Fig. 2 with parts removed showing details in construction.

Referring to Figs. 1, 2, 4, 5 and 6 of the drawings a forage blower embodying the present invention comprises generally a feed hopper 16 carried on a main frame 18 and extending forwardly therefrom. Rearwardly the feed hopper 16 connects with a blower housing 20 as at a feeder opening 22. The feed hopper 16 is provided with an endless conveyor 24 which carries the cut material rearwardly to the feeder opening 22. The blower housing 20 has rotatably supported therein a blower fan 26 secured on a central shaft 28 protruding rearwardly of the blower housing 20. A belt pulley 30 is secured on the rearward end of the shaft 28 and is connected to an outside power source, of any suitable type, as by a suitable belt 31. The conveyor 24 is driven by a sprocketed feeder roll 32 which in turn is operatively connected to the shaft 28 by a speed regulating means 34 including in the present instance an enclosed worm gear reduction power transmission means 36. A feed control beater 38 is rotatably secured adjacent the feeder opening 22 and is operatively associated with the sprocketed feeder roll 32 for regulating the stream of material entering the blower housing 20. The frame 18 is carried by transport wheels 40, the wheels 40 being adapted to be easily removed as will appear, allowing the frame 18 to rest upon the ground and thereby lower the ensilage blower in relation to a dump truck or trailer, which devices are commonly used for transporting the ensilage from the field to the blower, for filling the silo or place of storage. A drawbar 42 is secured with the frame 18 and adapted to be hitched to a propelling agency, as for example a tractor 43 for transporting the machine, the feed hopper 16 being upwardly pivoted, thereby providing a compact structure easily transported.

As illustrated in Fig. 3 the frame 18, in the present instance, comprises a pair of angle bars 44 bent into U-shaped frames and joined, as by welding or the like, end to end as at 46 forming thereby a substantially rigid rectangular framework 48. A transverse angle bar or axle 50, positioned across the rectangular framework as shown, is secured on the upper surface of the sides of the frame 48 as by welding or the like substantially parallel to the ends thereof. For supporting the framework 48 on the transport wheels 40, apertured end brackets 52 are secured as by welding or the like to the ends of the angle bar 50 and to the lateral surfaces of the framework 48. The end brackets 52 have formed therein holes 54 for reception of spindles 56 of the transport wheels 40, the circumference of said holes being substantially tangent to the sides of the angle bar 50. As can be seen, when the spindles 56 are inserted into the holes 54, the peripheries of the spindles 56 are frictionally adjacent the sides of the angle bar 50 when the wheels 40 are substantially normal to the horizontal as in transport position. The spindles 56 are maintained in their proper co-axial position with respect to the frame 18 by means of angle brackets 58. The angle brackets 58 are secured as by welding or the like to the angle bar 50 inwardly of the end brackets 52 and form with the angle bar 50 enclosed squares or box like sockets, the inner surfaces of said squares maintaining the spindles 56 against any movement other than axial movement inwardly or outwardly therethrough. The spindles 56 are secured within the enclosed squares by means of bolts 60, engaged in suitable holes in the brackets 58 and spindles 56, and as can be readily seen, the wheels 40 can be readily removed upon removal of the bolts 60 by sliding the spindles 56 out of the brackets 52 and 58. In this manner the wheels are easily disposed of when not needed, and without exposing to dirt the lubricated surfaces of the spindles and wheels. A transverse channel bar 62, substantially parallel to the angle bar 50, is secured as by welding or the like on the upper surface of the lateral sides of the framework 48. The channel bar 62 has formed therein an opening 64 for reception of above mentioned drawbar 42. Forwardly the drawbar 42 is accommodated in an opening 66 formed in a bracket 68 which is secured as by welding or the like to the framework 48 so as to support the drawbar 42 in a plane substantially parallel to the horizontal and extending in the direction of travel of the blower. The drawbar 42 is removably secured in position by a bolt 70 secured through the end of the drawbar 42 and a slidable collar 72, and a limit stop 74 secured on the drawbar 42 adjacent the forward surface of the bracket 68 as by a bolt 75. It will now be apparent that, upon removal of the bolt 70, the drawbar 42 can be easily removed from the bracket 68 and the channel bar 62 so that during operation of this blower while the feed hopper is pivoted upwardly for a dump truck or other conveying means to be positioned for discharge into the feed hopper 16 without necessitating the dump truck to be driven backwardly, as will be explained hereinafter, the drawbar will not impede the passage of the conveying means.

Drawbar 42 may be retracted if desired, rather than removed, bolt 75 being alternatively insertible in holes as 75ª so that limit stop 74 may be positioned as shown in Fig. 3 for transport, or as shown in Fig. 4 for operation, in the latter case, drawbar 42 being slidable somewhat further to the rear than shown in Fig. 4. With drawbar 42 in such position, clearance is provided for trucks to pass when the hopper 16 is raised to the position of Fig. 5. In this way the advantage of removing the drawbar is realized without the danger of its becoming lost or mislaid.

Rigidly mounted on the rearward upper portion of the frame 18 is the blower housing 20, see Figs. 4 and 6. The blower housing 20 is provided with a tangentially extending outlet or port 76 to which is adapted to be connected conventional blower pipes, not shown in the drawings, for conveying the material into a silo or other like storage place. The forward face of the blower housing 20 has formed therein the feeder opening 22 located substantially in the center of the forward face of the blower housing 20 so that the material conveyed into the blower housing is delivered substantially into the center of the fan wheel 26 in an area of relatively low velocity, and discharged out the port 76 as will be explained more fully hereinafter.

The feed hopper 16 comprises a conveying trough 78 and a receiving trough 80 pivotally secured to the conveying trough 78 and extending forwardly therefrom. The conveying trough 78 in the present instance, comprises a frame 82 and side members 84 formed of light gage steel sheets or similar material secured to said frame 82 as by rivets or the like and secured rearwardly to the forward face of the blower housing 20, enclosing the sides of the feeder opening 22. The frame 82 includes forwardly extending parallel members 86 and 88. The frame members 86 and 88 are carried rearwardly between upwardly extending support bars 90 and 92 as by bolts or the like 94 and forwardly between brackets 96 as by bolts or the like 98 see Figs. 1 and 5. The members 88 extend upwardly and rearwardly toward the feeder opening 22 of the blower housing 20 while the members 86 are substantially horizontal. The support bars 90 and 92 are secured to the angle bar 50 as by welding and braced against excessive vibration of the conveying trough 78 when the blower is in operation by braces 100 secured between the bars 90 and 92 and the frame 18.

For pivotally securing the receiving trough 80 to the forward end of the conveying trough 72, opposed plates 102 and 104, Fig. 8, are secured adjacent the forward ends of the frame members 86 and 88 as by bolts 98. Forwardly the plates 102 extend laterally and forwardly for reception of pivot plates 106 of the trough 80 between these plates and plates 104. The pivot plates 106 which, as will appear, are secured to the receiving trough 80, are pivotally secured between plates 102 and 104 as by pins 108 or the like retained therein as by washer and lock means 110.

The receiving trough in the present instance comprises a frame 112 made up of forwardly extending members 114 and 116 secured as by welding or the like to ribs 118, 120 and 122 (see Figs. 1, 2, 14 and 15). Side members 124, preferably formed of light gage steel sheets or similar material, are secured to the framework 112 as by rivets or the like so as to form thereby a trough-like structure for reception of the cut ensilage. The rib 122 as disclosed in the drawings, is positioned forwardly on the receiving trough and has downwardly extending legs 126 and 128 braced by a member 130 for supporting the forward portion of the receiving trough from the conveying trough when the ensilage blower is in operation. As can be easily appreciated a hopper constructed as disclosed is rigid and not prone to twisting or torsional bending.

As previously suggested the receiving trough 80 is pivotally secured to the conveying trough 78 whereby a compact structure can be had convenient to move from one place to another when the wheels 40 are in position, and one which will occupy a minimum amount of space when in storage. The pivot plates 106 as already suggested are secured to the respective ends of the frame members 114 and 116, as by bolt means 132 pivotally securing the receiving hopper 80 about the pivot bolts 108. To provide a definite upper position of the trough 80 about the pivot bolts 108, bolts 134 (see Figs. 4 and 5) are secured as by a washer and lock means 136 in slots 138 of slotted guide arms 140 which are pivotally secured adjacent their rearward ends on each side of the trough 80 to ears 142 which in turn are welded or otherwise secured to the brackets 96. As can be seen, when the trough 80 is pivoted upwardly about the pivot bolts 108, the bolts 134 slide upwardly in the slots 138 of the guide arms 140, the guide arms defining the limits of the arc of upward movement of the trough 80 about the pivot bolts 108 and preventing bending of the sides of the troughs 78 and 80 by reason of excessive movement.

The rearward extremities of the side members 124 are arranged to fit between the side members 84 so that when the trough 80 is pivoted upwardly the side members 124 will be accommodated between and within the side members 84 of the trough 78. When the wheels 40 are removed and the frame 18 is supported upon the ground, the trough 80 is maintained substantially horizontal to the ground by the downwardly extending legs 126 and 128 of the frame rib 122 as previously suggested. When the trough is maintained in this position the side members 124 and 84 form contiguous surfaces assuring thereby against the loss of ensilage or the clogging of material between the joining surfaces 124 and 84 (see also Fig. 7).

To aid in pivoting the trough 80 about the pivot bolts 108, counterbalance means 144, as best seen in Fig. 1, are provided between the trough 80 and the trough 78. The counterbalance means 144 comprise springs 146 secured one on each side of the feed hopper 16 by eye bolts 148, which are secured to the frame rib 120, and eye rods 150, which are secured rearwardly as by a bolt or the like to laterally extending brackets 152. The brackets 152 are secured to the plates 102 as by welding or the like and extend laterally therefrom substantially normal to the plates 102 (see also Fig. 8). Brace supports 154 and 156 support the brackets 152 against the forces exerted by the springs 146. By pulling on the pivot points 151 which are upwardly displaced from pivots 108 the counterbalance means 144 lightens the weight of the trough 80 about the pivot bolts 108 and permits one person to pivot the trough 80 to any desired position. A chain means 158 is adaptable to secure the trough 80 in its raised position when the user wishes to transport or store the machine.

Floor members 160 and 162 (see Figs. 2, 4 and 14), are secured by means of rivets or the like to the frame members 114 of the trough 80 and to the frame members 88 of the conveying trough 78 respectively, forming thereby with the side members 124 and 84 respectively a receptacle for reception of ensilage or similar material. For conveying the ensilage rearwardly into the feeder opening 22 of the blower housing 20, the endless conveyor 24, comprising chains 164 and raddles 166 secured transversely between the chains 164 at spaced intervals thereon, is driven rearwardly around the floor members 160 and 162 by the sprocketed feeder roll 32 rotatably secured rearwardly of the rearward end of the floor member 162. Forwardly the chain 164 is supported around sprockets 168 on a shaft 170 secured rotatably between forwardly extending arms 172 of the frame rib 122 (see Fig. 15). As can be easily seen, when the sprocketed feeder roll 32 is rotated clockwise, Fig. 4, the conveyor 24 above the member 160 and 162 is moved rearwardly toward the feeder opening 22, chain 164 intermeshing with the teeth of the sprocketed feeder roll 32 and the sprockets 168. For maintaining the raddles 166 in intimate contact with the floor members 160 and 162, particularly at the juncture of the floor members when the machine is in operation for conveying the ensilage from the feed hopper 16 into the blower housing 20, arms 174 (see also Figs. 1 and 4) are secured to the frame members 86 and 88 of the trough 78 and extend upwardly, and provided adjacent their upper ends with bent guide shoes 176. As will be apparent, the chains 164 run between the guide shoes 176 and the floor member 162 keeping thereby the raddles 166 in close relationship with the floor members 162 and 160 at all times when the blower is in operation or in transport position.

As has already been suggested the sprocketed feeder roll shaft 32 is operatively connected with the shaft 28 by the speed regulating means 34 and the worm reduction gear 36. As should be clear, by regulating the speed at which the feeder shaft is driven, it is possible to regulate the amount of ensilage carried rearwardly into the feeder opening 22, the speed of the blower fan 26 remaining constant. In the standard ensilage blower the usual arrangement is to provide a driven pulley shaft on which the blower fan is carried, and then, by means of a sprocket wheel and chain and through a countershaft, to deliver power to a large sprocket wheel that serves to drive an enclosed gear mechanism, which in turn drives a shaft that is connected to the speed regulating shaft, various sizes of sprocket wheels being brought into play to change the speeds. One of the salient features of this invention is to provide a variable V-belt pulley on the blower shaft and connected by means of a V-belt to another pulley which transmits the motion of the blower shaft to the sprocketed feeder roll 32 by means of the worm reduction gearing 36 providing thereby a simple, convenient and quiet means for regulating the feed of the conveyor 24 independently of the speed of the blower fan.

These objects of the invention are accomplished by providing a supplementary frame 178, composed in the present instance, of angle bars secured to the rearward face of the blower housing 20 and extending rearwardly therefrom substantially normal thereto (see Figs. 1, 2, 4, 5, 6 and 9). Cantilevers 180 and brace rods 182 support the rearward extremities of the frame 178 with respect to any undue force or thrust exerted thereupon. The shaft 28 is rotatably secured in conventional antifriction bearings which bearings are generally designated as 184 which in turn are secured as by bolts or the like to the ends of the frame 178. The forward end of the shaft 28 as previously suggested is extended forwardly into the blower housing 20 through a hole 186 formed therein and has keyed thereon the blower fan 26 which is rotatable within the blower housing 20. Rearwardly the shaft 28 has fixed thereon as previously suggested the belt pulley 30 which is adapted to be connected to an outside power source as by belt 31 or the like, this outside source transmitting rotary motion to the shaft 28 and the blower fan 26. Rotatably secured to the shaft 28 intermediate the blower fan 26 and the belt pulley 30 is a variable V-belt pulley 188 which is connected to a V-pulley 190 as by a V-belt 192. The pulley 190 is non-rotatably secured to a shaft 194 which is rotatably supported on an arm 196 extending laterally from the rearward end of a holding bracket 200 as by a suitable bearing 198 Fig. 2. The holding bracket 200 is secured to the periphery of the blower housing 20 substantially normal thereto by any suitable means. The sprocketed feeder roll shaft 32 extends laterally from the receiving trough 78 toward a hole 202 formed in the holding bracket 200. The transmission means 36 can be of any conventional or suitable construction including in the present instance a worm 204 Fig. 5 and a gear wheel 206 in mesh with the worm 204 both being enclosed in a housing 208 which in turn is secured to said holding bracket 200 as by bolts or the like. The gear wheel 206 is provided with an inwardly extending shaft 210 rotatably mounted in a bearing 212 Fig. 6, fitted in the hole 202 of the bracket 200. The sprocketed feeder roll 32 and the shaft 210 are coupled one to the other by means of a suitable coupling 214 which coupling accommodates any slight misalignment of the shafts 32 and 210 and which tends to absorb shocks and vibrations of the respective parts when the machine is in operation. The pulley 190 transmits the rotary motion of the shaft 28 to the shaft 194 which in turn is flexibly connected to the worm gear 204 by means of a suitable coupling 216.

As can be seen, when the shaft 28 is rotated by the belt pulley 30, a like rotative motion is imparted to the variable V-belt pulley 188 which in turn transmits this rotary motion to the shaft 194 by means of the V-belt 192 and the V-pulley 190. The rotary motion of the shaft 194 is transmitted to the shaft 210 by means of the worm gear reduction system 36 which in turn imparts a rotative motion to the sprocketed feeder roll 32 by means of the coupling 214.

By making the pulley 188 in a manner to have a variable effective diameter with respect to belt 192 the velocity imparted to the pulley 190 by the V-belt 192 can be varied in respect to the velocity of the shaft 28 thereby providing an easy means for regulating the speed of the conveying means 24. The pulley, as best seen in Fig. 4, comprises flanges 218 and 220, the flange 220 being fixed to the shaft 28 and secured thereto as far as movement is concerned by bolt means 222, and the flange 218 being axially slidable but non-rotatable on the shaft 28 adjacent to and in working relation with flange 220 as previously suggested. For regulating the axial movement of the movable flange 218 with respect to the fixed flange 220 for regulating the rate of travel of the conveyor 24, a shifting means 224 is provided. The shifting means 224 comprises a forked arm 226 pivotally secured as by a pivot or the like 228 to arms 230 extending from the frame 178. The forked arm 226 extends upwardly straddling a shifting ring 232, and pivoted to the periphery thereof as by trunnions or the like 234 (see also Fig. 9). The shift ring 232 comprises a flanged housing 236 rotatably secured on a hub portion 238 of the slidable flange 218 by means of an anti-friction bearing 240 fitted between the flange of the housing 236 and the hub portion 238, an inner race 242 being fitted on the hub portion 238, and an outer race 244 being press fitted within the flange of the housing 236. As can be seen, when the flange 218 is rotated, the inner race 242 rotates a like amount in the same direction, the outer race 244 remaining non-rotatable with the housing 236. By pivoting the shifting arm 226 either forwardly or rearwardly about the pivot 228, the shifting ring 232 is shifted axially, imparting a pushing or pulling force to the hub portion 118 of the flange 218 thereby shifting it axially and increasing or decreasing the pitch of the pulley 188 and regulating the speed of the V-belt 192. Since flange 220 remains axially immovable on shaft 28, shifting of flange 218 results in narrowing or widening the resulting V-groove between the flanges and, since the width of belt 98 remains constant, it runs correspondingly further from, or nearer to the center of the pulley and shaft 28, or, in other words at a greater or lesser pitch diameter, as the case may be.

To provide an idler whereby the travel of the conveyor 24 may be stopped without stopping the rotation of the blower fan 26, a conventional anti-friction bearing 246 is positioned on the shaft 28 adjacent the inner surface of the fixed flange 220 accommodated by a cupped portion 248 of the flange 218. The bearing 246 comprises a customary inner race 250, an outer race 252, and anti-friction elements 254 confined therebetween. As can be seen when the pitch diameter of the pulley 188 is decreased to such an extent that the V-belt comes to rest upon the outer race 252 of the bearing 246, the travel of the V-belt 192 is stopped, the outer race 252 coming to rest with respect to the inner race 250.

As will be clear, the pressure of the V-belt 192 upon the inner surface of the flange 218 exerts a constant pressure against the forked arm 226 tending to pivot the arm rearwardly about the pivot 228, when the blower is in operation.

For maintaining or adjusting the pivotal movement of the forked arm 226 for maintaining or adjusting the pitch diameter of the pulley 188, a clutch or control lever 256 is provided, pivoted at its lower end as by a pin, bolt or the like 258 to an upstanding bracket 260 secured as by welding or the like to the blower housing 20, a link generally designated as 262 is pivoted at 263 to the upper extremity of forked arm 226 and at 263a to control lever 256 at a point spaced from above mentioned pivot 258 so that when clutch lever 256 is pivoted either forwardly or rearwardly the forked arm 226 will be pivoted in the same direction. The bracket 260 has formed therein a slot 264, Fig. 6, lying in the path of travel of the link 262 so that the link will pass into the slot when the lever 256 is pivoted forwardly and downwardly. This represents the extreme forward travel of the lever 256 and slot 264 is made just deep enough to serve as a limit stop for such forward and downward travel of link 262 and accordingly lever 256 although other stop means is considered as within the contemplation of the invention. When lever 256 is so positioned, link 262 will pull on the arm 226 thereby pivoting the same forwardly and consequently sliding flange 218 axially forward and engaging V-belt 192 with the sides of the flanges 220 and 218. This starts the conveying mechanism 24 as will be apparent. The depth of slot 264 is such that in this position of the parts pivot 263a will have traveled beyond the extension of a line through pivots 263 and 258. The continued pull on link 258 exerted by arm 226 will, therefore, tend to swing lever 256 in a counterclockwise direction as seen in Fig. 4 and, since further movement is prevented by engagement of link 262 with the lower extremity of slot 264, the parts are locked in position until intentionally dislodged. In this manner the pitch diameter of pulley 188 is maintained at a predetermined value.

For varying the pitch diameter of the pulley 188 the link 262 is provided with a center section 266 threadedly engaged with a portion 267 connected with pivot 263, portion 266 also being threadedly engaged with a portion 267a connected with pivot 263a, the threads on portions 267 and 263a differing in pitch so that turning portion 266 will have the effect of lengthening or shortening the assemblage which thus acts as a turn buckle, for increasing or decreasing the length of the link 262. When the blower is in operation the clutch lever 256 is pivoted forwardly so as to rest the link 262 in the slot 264 maintaining the flanges 218 and 220 in their proper operative position. If the operator should desire to increase or decrease the speed of the conveyor 24 without increasing or decreasing the speed of the blower fan, the link 262 can be increased or decreased in length as by the turn buckle portion 266, pivoting the forked arm 226 forwardly or rearwardly as desired and consequently increasing or decreasing the pitch diameter of the pulley 188. If the operator wishes to stop the conveyor 24 suddenly without stopping the blower fan 26 he has merely to pivot the lever 256 sufficiently upwardly until the pivotal connection 263a of the link 262 is sufficiently above the pivot bolt 258 so that the upward movement of the force exerted by the V-belt 192 upon the flange 218 is sufficient in and of itself to pivot the forked arm 226 rearwardly and the lever 256 upwardly and rearwardly until the V-belt 192 rests upon the idler bearing 246. When the V-belt rests upon the idler bearing 246 the link 262 can easily be lengthened or shortened by manipulating the turn buckle portion 266 before re-engagement of the link 262 in the slot 264. As previously mentioned the link 262 can be further adjusted when the link 262 is accommodated in the slot 264 thus enabling the operator to more accurately regulate the speed of the belt 192. It should be appreciated that the above shown means enables the operator to easily and accurately adjust the rate of speed of the conveyor 24 from either side of the blower mechanism and further enables the operator to quickly stop the rate of travel of the conveyor 24 in the event of stones or other objectionable material mingling with the ensilage being conveyed into the blower housing 20.

In the event of such stoppage, or for that matter any stoppage of the conveyor for any purpose, it will be noted that the adjustment of link 262 is not disturbed, so that, when lever 256 is again manipulated to start the conveyor, the previous rate of operation is immediately restored and without any particular attention on the part of the operator.

For maintaining the V-belt taut on the pulleys 188 and 190 irrespective of the pitch of the pulley 188, pulley wheels 268 and 270 are provided. Pulley wheel 268 is rotatably secured on a shaft 272 which is fixed on a bracket 274 which in turn is secured by bolts or the like 276 to the blower housing 20. Pulley wheel 270 is rotatably secured to a pivot arm 278 which is pivotally secured in a bracket 280 welded or the like to the supplementary frame 178. The V-belt 192 travels around the pulley 190, under the pulley wheel 270, and then around the variable pulley 188, and under the pulley wheel 268. To maintain the belt 192 taut a spring means 282 is secured, in the present instance, between the end of the pivotal arm 278 remote from bracket 280 and a finger 284 secured as by welding or the like to the framework 48 of the frame 18. As will be clear the spring means 282 exerts a constant downward pressure on the pivotal arm 278, the wheel pulley 270 maintaining the belt 192 taut regardless of changes in the pitch of the variable pulley 188.

For discharging the ensilage out the housing 20 the blower fan 26 is journaled within the housing 20 on shaft 28 as already stated. The fan 26 as best seen in Figs. 10 and 11, comprises in the present instance, a hub 286 and a disk member 288 secured as by welding or the like to the hub portion 286. Fan arms or radial ribs 290 are tangentially secured as by welding or the like to the periphery of the hub portion 286 at spaced intervals thereon and extend outwardly therefrom secured as by welding or the like to the face of the disk member 288. The fan arms 290 are given a preferably trailing curvature or bent at 291, and provided at their ends with paddles 292. The paddles 292 include in the present instance blower blades 294 which are secured by welding or the like to L-shaped brackets 296. The L-shaped brackets 296 are secured as by rivets or other suitable means 298 adjacent the ends of the arms 290 and to the disk member so as to position the blades 294 adjacent the ends of the arms 290. In this way a very substantial anchorage is provided for brackets 296, where the area for welding is relatively limited. The hub 286 is keyed or otherwise fixed on the shaft 28 as by key means 300, Fig. 4, within the housing 20. As has already been suggested, the conveyor 24 delivers the ensilage rearwardly to the feeder opening 22 which opens substantially at the center of the fan 26. By delivering the ensilage into the center of the fan 26 the ensilage enters an area of low velocity, and as the ensilage is moved outwardly along the bent fan arms 290 by centrifugal force, the velocity of the ensilage is gradually increased until it reaches the paddles 292 wherein attains its maximum velocity and is thrown out the discharge port 76.

To further regulate the stream of material flowing into the blower housing 20 the feed control beater 38 Fig. 4, of any conventional or suitable design comprising, in the present instance, a shaft 302 Fig. 12 having end members 304 and sides 306 enclosing the shaft 302 and secured as by rivets or the like to the end members 304, is rotatably journaled in bearings 308 Fig. 1 carried by brackets 310 which are secured to the parallel support bars 90 and 92. The leading edges of the sides 306 are serrated to provide outwardly extending points or prongs 312 for engaging the cut material. As previously suggested, the feed control beater 38 is operatively associated with and is driven by the sprocketed feeder roll shaft 32 for regulating the rate of rotation of the beater 38 with respect to the rate of travel of the conveyor 24. A sprocket wheel 314 Fig. 6, is secured to the sprocketed feeder roll 32 laterally of the receiving trough 78 adjacent the support arm 92 and is connected as by a chain 316 to a sprocket 318 non-rotatably secured on the shaft 304 of the beater 38 laterally of the converying trough 78. As already suggested, the rotation of the beater 38 is governed by the rotation of the conveying means 24, any change in the rate of travel of the conveyor being accompanied by a proportionate change in the rate of rotation of the beater 38. It should also be apparent that while the conveyor travels toward the blower opening 22 so as to urge the ensilage in the feed hopper 16 toward the blower housing 20, the beater 38 rotates against the direction of movement of the conveyor so as to beat or level the stream of ensilage being carried to the blower fan 26 so as to prevent too large a mass of ensilage from entering the housing 20 at any one time. This mass or stream of material such as ensilage which enters the blower housing 20 is controlled by regulating the size of the feeder opening 22 by the beater 38. As disclosed, the beater 38 is adjustable along the confines of parallel adjacent slots 320 Fig. 5, formed in the trough 78 adjacent the support bars 90 and 92, the bearing brackets 310 being adjustable on the bars 90 and 92. For maintaining the chain 316 taut regardless of the position of the beater 38 on the bars 90 and 92, an idler sprocket 322 is rotatably secured in a bracket 324 extending forwardly from the bar 92 and adjustable along the confines of a slot 326 formed in the bracket 324. To prevent the ensilage from being thrown out of the trough 78 by the beater 38, a hood 328 is formed over the beater 38 so as to urge the ensilage thrown upwardly by the beater 38, downwardly and back into the trough 78.

For delivering the back feed, if any, of the conveyor 24 back into the receiving trough 80, a bottom member 330 (Figs. 14 and 15) is secured as by rivets or the like to the frame member 116 so as to enclose the forward return travel of the conveyor 24 around the floor member 160. Forwardly an end member 332 is secured to the end of the trough 80, the end member 332 being formed so as to lie adjacent the path of travel of the conveyor 24 around the sprockets 168 of the shaft 170. During the operation of this blower the conveying means 24 travels forwardly on the floor members 160 and 162 and rearwardly on the bottom member 330, any back feed which may have accumulated below the floor member 162 of the trough 78 being urged by the raddles 166 onto the bottom member 330 and consequently back upon the floor member 160 by means of the end member 332. It should be appreciated that by providing a means whereby the back feed of the conveyor can be returned to the receiving trough much waste and manual labor is eliminated.

In the operation of this blower, the machine is pulled to the operating site on the wheels 40. To ready the machine for operation the wheels 40 are removed, in a manner as previously described, so that the machine rests upon the ground on the frame 18, thereby lowering the feed hopper with respect to the ground so that a dump truck or other unloading means can easily empty into the hopper. Since on most farms the cut ensilage is transported from the field by means of dump trucks or dump trailers, it is advantageous to pivot the receiving trough of the blower upwardly so that the dump truck can be driven forwardly beyond the upwardly-pivoted trough and stopped shortly beyond the trough so that when the latter is pivoted into an operative position the dump truck is positioned to be unloaded therein without requiring the driver of the truck to drive backwardly. Towards this end the drawbar 42, as previously described, is removed. When it is desired to move the machine, as for instance when the blowing operation is finished, the drawbar 42 can be reinserted on the machine, along with the wheels 40, so that the machine can be pulled to a place of storage, the trough 80 being pivoted upwardly and held in such position by the chain 158.

It is believed that the construction and operation of the machine disclosed will be apparent from the foregoing description, and while for purposes of illustration we have disclosed but a single embodiment of our invention, it will be understood that many changes and modifications may be made therein without departing from the spirit of the invention, and we consider ourselves as entitled to all such changes and modifications which fall within the scope of the claims hereto appended.

Having now described our invention and in what manner the same will be used, what we claim as new and desire to protect by Letters Patent is:

1. In a forage blower having a blower housing with an inlet, a feed hopper disposed so as to be in feeding relationship with respect to said inlet, conveyor means for conveying material from the feed hopper into the blower housing, a feed control beater for regulating the flow of material into said blower housing, a shaft extending into said blower housing, a blower fan secured to said shaft within said housing, means for rotating said shaft, a power transmitting means connected to said conveyor for imparting rotary motion thereto, said power transmitting means including a shaft extending in the same direction as the first mentioned shaft and substantially parallel thereto, and a transmission means between said power transmitting means and said feed control beater for imparting a proportionate rotation of said feed control beater for rotating said beater against the flow of material into said blower housing, the combination of a variable speed V-belt transmission interconnecting said first mentioned shaft to said power transmitting shaft, said V-belt transmission including a variable pitch pulley secured on said first mentioned shaft, a pulley secured on said power transmitting shaft and in power alignment with said variable pitch pulley, a V-belt drivingly connecting said pulleys, and means for effecting varying pitch relationships of said variable pitch pulley for selectively driving said beater and said conveyor at a speed independent of the speed of rotation of said blower fan.

2. In a forage blower having a blower housing, a conveyor for delivering material into said blower housing, a rotatable shaft extending into said blower housing, a blower fan secured on said shaft within said housing, means for rotating said shaft, power transmission means drivingly connected to said conveyor and including a shaft extending in the same direction as the first mentioned shaft and substantially parallel thereto, and a V-belt transmission between said first mentioned shaft and the second mentioned shaft for drivingly connecting said first mentioned shaft to said conveyor, the combination of a variable pitch pulley including an axially fixed flange and an axially movable flange, said axially movable flange being adjacent to and in working relation with said axially fixed flange, a swingable arm rotatably secured with said movable flange and fulcrumed for fore-and-aft swinging movement for effecting axial movement of said movable flange in response to swinging movement of said arm, a rigid support, a lever swingably secured to said support and swingable in the direction of swinging movement of said arm, said support having formed thereon adjacent the lever a limit stop, and a link pivotally secured between said lever and said swingable arm and so positioned with respect to said lever and said swingable arm that when said lever is swung in one direction for axially shifting said movable flange adjacent said fixed flange, said link will abut said limit stop, the pivotal connection of said link to said lever passing beyond a plane through the axes of the pivotal connection of said lever with said support and of said link with said swingable arm so that a force exerted against said movable flange tending to shift said movable flange away from said fixed flange will tend to lock said link against said limit stop.

3. In a forage blower having a blower housing, a conveyor for delivering material into said blower housing, a rotatable shaft extending into said blower housing, a blower fan secured on said shaft within said housing, means for rotating said shaft, power transmission means drivingly connected to said conveyor and including a shaft extending in the same direction as the first mentioned shaft and substantially parallel thereto, and a V-belt transmission between said first mentioned shaft and the second mentioned shaft for drivingly connecting said first mentioned shaft to said conveyor, the combination of a variable pitch pulley including an axially fixed flange and an axially movable flange, said axially movable flange being adjacent to and in working relation with said axially fixed flange, a swingable arm rotatably secured with said movable flange and fulcrumed for fore-and-aft swinging movement for effecting axial movement of said movable flange in response to swinging movement of said arm, a rigid support, a lever swingably secured to said support and swingable in the direction of swinging movement of said arm, said support having formed thereon adjacent the lever a limit stop, and a turn buckle pivotally secured between said lever and said swingable arm and so positioned with respect to said lever and said swingable arm that when said lever is swung in one direction for axially shifting said movable flange adjacent said fixed flange, said turn buckle will abut said limit stop, the pivotal connection of said turn buckle to said lever passing beyond a plane through the axes of the pivotal connection of said lever with said support and said turn buckle with said swingable arm so that a force exerted against said movable flange tending to shift said movable flange away from said fixed flange will tend to lock said turn buckle against said limit stop.

4. In a forage blower having a blower housing with an inlet, a feed hopper disposed so as to be in feeding relationship with respect to said inlet, conveyor means for conveying material from the feed hopper into the blower housing, a feed control beater for regulating the flow of material into said blower housing, means for moving said feed control beater into adjusted positions with respect to the conveying means for regulating the thickness of the apron of material delivered into said blower housing, a shaft extending into said blower housing, a blower fan secured on said shaft within said housing, means for rotating said shaft, a power transmitting means connected to said conveyor for imparting rotary motion thereto, said power transmitting means including a shaft extending in the same direction as the first mentioned shaft and substantially parallel thereto, and a transmission means between said power transmitting means and said feed control beater for imparting a proportionate rotation to said feed control beater for rotating said feed control beater against the flow of material moving into said blower housing, the combination of a variable speed V-belt transmission connecting said first mentioned shaft to said power transmitting shaft, said V-belt transmission including a pulley secured on each of said shafts in power alignment, at least one of said pulleys being of the variable pitch type, a V-belt drivingly connecting said pulleys, and means for effecting varying pitch relationships of said variable pitch pulley. for regulating the rate of travel of said conveying means and said beater independently of the speed of rotation of said blower fan.

5. In a forage blower having a blower housing, a feed hopper, and means for conveying material from the feed hopper into the blower housing, the combination of a feed control beater for regulating the flow of material into said blower housing, means for moving said feed control beater into adjusted positions with respect to the conveying means for regulating the thickness of the apron of material delivered into said blower housing, a shaft extending into said blower housing, a blower fan secured on said shaft within said housing, means for rotating said shaft, a power transmitting means for imparting rotary motion to the conveying means, a variable speed V-belt transmission interposed between said shaft and said power transmitting means for regulating the rate of travel of said conveying means independently of the speed of rotation of said blower fan, a transmission means between said power transmitting means and said feed control beater for imparting a proportionate rotation to said feed control beater for rotating said feed control beater against the flow of material into said blower housing, and a hood formed over the beater and extending forwardly from the blower housing sufficiently to preclude back feeding by the beater upon the feed hopper's being loaded and to urge any material thrown upwardly by the beater downwardly into the feed hopper.

6. In a forage blower having a blower housing, a feed hopper, conveyor means for delivering material from the feed hopper into the blower housing, a shaft extending into said blower housing, a fan fixed to said shaft and positioned for rotation within said blower housing, means for rotating said shaft, power transmission means drivingly connected to said conveyor and including a shaft extending in the same direction as said fan shaft and substantially parallel thereto, and a V-belt transmission between said fan shaft and the second mentioned shaft for drivingly connecting said fan shaft to said conveyor, the combination of a variable pitch pulley including an axially fixed flange and an axially movable flange, said axially movable flange being adjacent to and in working relation with said axially fixed flange, an upwardly extending arm rotatably secured with said axially movable flange and fulcrumed for effecting axial movement of said movable flange with respect to said fixed flange in response to fore-and-aft swinging movement of said arm, a rigid support, and an over-centered linkage arrangement carried by said support and connected to said swingable arm upon said linkage system being moved into its over-centered position, said movable flange being moved adjacent said fixed flange so that the force tending to axially move the movable flange maintains the linkage arrangement locked in its over-centered position.

7. The invention defined in claim 6 further characterized by said over-centered linkage including a longitudinally extensible link connected to said swingable arm, said movable flange, in response to swinging of said arm upon said over-centered linkage being moved into its over-centered locked position, being capable of being moved into varying axial positions with respect to said fixed flange.

8. The invention defined in claim 7 further characterized by said longitudinally extensible link being in the form of a turn buckle.

9. The invention defined in claim 8 further characterized by an axially fixed idler being positioned between said fixed flange and said axially movable flange.

10. A device of the character described, comprising the combination with a hopper, of a conveyor operable along the bottom of the hopper, a fan shaft extending in the direction of travel of the conveyor and positioned adjacent the discharge end thereof, a fan on the shaft adjacent the end thereof in close proximity to the discharge end of said conveyor, a blower housing enclosing the fan and having an inlet disposed so as to be in receiving relationship with respect to the discharge end of said conveyor, a power transmission means connected to said conveyor for transmitting driving energy thereto, said power transmission means including a shaft laterally spaced from said blower housing and substantially parallel with said fan shaft, a pulley mounted on one of said shafts, said pulley including a flange fixed on said one shaft and an axially movable flange slidably secured on said one shaft adjacent to and in working relation with said fixed flange, a second pulley fixed on the other of said shafts and in power alignment with the first mentioned pulley, a V-belt drivingly trained around said pulleys, and means carried by said blower housing and connected with said movable flange for holding said movable flange in varying pitch relationship with respect to said fixed flange whereby the speed of rotation of the power transmission shaft can be adjusted independently of the speed of rotation of said fan shaft.

11. A device of the character described, comprising the combination with a hopper, of a conveyor operable along the bottom of the hopper, a fan shaft extending in the direction of travel of the conveyor and positioned adjacent the discharge end thereof, a fan on the shaft adjacent the end thereof in close proximity to the discharge end of said conveyor, a blower housing enclosing the fan and having an inlet disposed so as to be in receiving relationship with respect to the discharge end of said conveyor, a power transmission means connected to said conveyor for transmitting driving energy thereto, said power transmission means including a shaft laterally spaced from said blower housing and substantially parallel with said fan shaft, a driving pulley mounted on said fan shaft adjacent the other end thereof, said driving pulley including a flange fixed on said fan shaft and an axially movable flange slidably secured on said fan shaft adjacent to and in working relation with said fixed flange, a driven pulley fixed on the second mentioned shaft and in power receiving alignment with said driving pulley, a V-belt drivingly trained around said pulleys, and means carried by said blower housing and connected with said movable flange for holding said movable flange in varying pitch relationship with respect to said flange whereby the speed of rotation of said driven pulley can be changed with respect to the speed of rotation of said fan shaft.

12. A device of the character described, comprising the combination with a hopper, of a conveyor operable along the bottom of the hopper, a fan shaft extending in the direction of travel of the conveyor and positioned adjacent the discharge end thereof, a fan on the shaft adjacent the end thereof in close proximity to the discharge end of said conveyor, a blower housing enclosing the fan and having an inlet disposed so as to be in receiving relationship with respect to the discharge end of said conveyor, a power transmission means connected to said conveyor for transmitting driving energy thereto, said power transmission means including a shaft laterally spaced from said blower housing and substantially parallel with said fan shaft, a driving pulley mounted on said fan shaft adjacent the other end thereof, said driving pulley including a flange fixed on said fan shaft and an axially movable flange slidably secured on said fan shaft adjacent to and in working relation with said fixed flange, a driven pulley fixed on the second mentioned shaft and in power receiving alignment with said driving pulley, a V-belt drivingly trained around said pulleys, a swingable arm rotatably connected to said movable flange and fulcrumed for fore-and-aft swinging movement, said movable flange being axially shifted on said fan shaft in response to swinging movement of said arm, a support on said blower housing, a lever pivotally connected to said support for fore-and-aft swinging movement, a longitudinally extensible link pivotally interconnected between said lever and said swingable arm for causing swinging of said arm in response to said lever being swung in one direction for axially shifting said movable flange into working relationship with respect to said fixed flange, longitudinal adjustment of said link effecting a change in the pitch of said driving pulley whereby the speed of rotation of said driven pulley can be changed with respect to the speed of rotation of said fan shaft.

13. A device of the character described, comprising the combination with a hopper, of a conveyor operable along the bottom of the hopper, a fan shaft extending in the direction of travel of the conveyor and positioned adjacent the discharge end thereof, a fan on the shaft adjacent the end thereof in close proximity to the discharge end of said conveyor, a blower housing enclosing the fan and having an inlet disposed so as to be in receiving relationship with respect to the discharge end of said conveyor, a power transmission means connected to said conveyor for transmitting driving energy thereto, said power transmission means including a shaft laterally spaced from said blower housing and substantially parallel with said fan shaft, a driving pulley mounted on said fan shaft adjacent the other end thereof, said driving pulley including a flange fixed on said fan shaft and an axially movable flange slidably secured on said fan shaft adjacent to and in working relation with said fixed flange, a driven pulley fixed on the second mentioned shaft and in power receiving alignment with said driving pulley, a V-belt drivingly trained around said pulleys, a swingable arm rotatably connected to said movable flange and fulcrumed for fore-and-aft swinging movement, said movable flange being axially shifted on said fan shaft in response to swinging movement of said arm, a support on said blower housing, a lever pivotally connected to said support for fore-and-aft swinging movement, said support having formed thereon adjacent said lever a limit stop, a longitudinally extensible link pivotally secured between said lever and said swingable arm and so positioned wtih respect to said lever and said swingable arm that when said lever is swung in one direction for axially shifting said movable flange adjacent said fixed flange, said link will abut said limit stop, the pivotal connection of said link to said lever passing beyond a plane through the axes of the pivotal connection of said lever with said support and of said link with said swingable arm so that a force exerted by said V-belt against said movable flange tending to axially shift said movable flange away from said fixed flange will tend to lock said link against said limit stop.

References Cited in the file of this patent

UNITED STATES PATENTS

| Number | Name | Date |
|---|---|---|
| 303,375 | Huyett | Aug. 12, 1884 |
| 445,043 | Chandler | Jan. 20, 1891 |
| 1,149,904 | Foster | Aug. 10, 1915 |
| 1,349,948 | Echterling | Aug. 17, 1920 |
| 1,490,404 | Ronning et al. | Apr. 15, 1924 |
| 1,611,291 | Steege | Dec. 21, 1926 |
| 1,688,345 | Mursch | Oct. 23, 1928 |
| 1,926,269 | Easter | Sept. 12, 1933 |
| 1,966,831 | Oakes | July 17, 1934 |
| 2,075,423 | Bratschie | Mar. 30, 1937 |
| 2,180,838 | Saiberlich | Nov. 21, 1939 |
| 2,209,736 | Livingston | July 30, 1940 |
| 2,340,983 | Pfeiffer et al. | Feb. 8, 1944 |
| 2,464,973 | Freiden | Mar. 22, 1949 |
| 2,542,250 | Hill | Feb. 20, 1951 |
| 2,569,191 | Peterson | Sept. 25, 1951 |